US006510210B1

(12) United States Patent
Baughan (10) Patent No.: US 6,510,210 B1
(45) Date of Patent: Jan. 21, 2003

(54) COMMUNICATION ENABLED CONSUMER PRODUCTS AND CONTROLLER

(75) Inventor: Kevin J Baughan, Maidenhead (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/461,453

(22) Filed: Dec. 14, 1999

(51) Int. Cl.[7] .............................................. H04M 11/00
(52) U.S. Cl. ................................ 379/90.01; 379/102.03
(58) Field of Search ......................... 379/110.01, 90.01, 379/102.03; 455/420, 418, 556, 557

(56) References Cited

U.S. PATENT DOCUMENTS

| | | | | |
|---|---|---|---|---|
| 5,802,467 A | * | 9/1998 | Salazar et al. ............... | 455/420 |
| 5,901,366 A | * | 5/1999 | Nakano et al. ......... | 379/110.01 |
| 5,963,624 A | * | 10/1999 | Pope ...................... | 379/110.01 |
| 6,192,340 B1 | * | 2/2001 | Abecassis .................... | 455/418 |
| 6,223,029 B1 | * | 4/2001 | Stenman et al. ............ | 455/420 |

* cited by examiner

*Primary Examiner*—Stella Woo
(74) *Attorney, Agent, or Firm*—Lee, Mann, Smith, McWilliams, Sweeney & Ohlson (57) ABSTRACT

A consumer entertainment device (for example, a games console, audio recording player, radio frequency broadcast reception apparatus) comprising a telecommunications transceiver arranged for communication over a customer premises network. The device may also comprise telephony handset apparatus, making shared use with the entertainment control apparatus of the telecommunications transceiver. Also a media connections unit arranged to inter-work between such a consumer entertainment device and a public network. Additionally, a network gateway comprising an access control unit whereby to control access to a network from a remote media connections unit.

18 Claims, 5 Drawing Sheets

COMMUNICATION ENABLED CONSUMER PRODUCTS AND CONTROLLER

FIELD OF THE INVENTION

The present invention relates to apparatus integrating telecommunications functionality with consumer devices, a method of operating the same, and a system incorporating the same.

BACKGROUND TO THE INVENTION

The mobile telecommunications operators and mobile phone suppliers have recognized the huge potential of the youth market, and have been highly successful in that segment through a combination of pay-as-you-talk tariffs, fashionable products and new capabilities—such as the GSM short message service. This initial success is now being built upon through the introduction of WAP (Wireless Access Protocol) standards to allow mobile phone to access the Internet, and by combining the mobile phones with other networked consumer devices such as MP3 players.

Although mobile based services will continue to grow dramatically, they do have limitations in their ability to fully address the youth market they are expensive—and teenagers are typically very cost conscious; they have limited data rates that inevitably limit their ability to address Internet based applications until $3^{rd}$ generation networks are widely available at a competitive price.

Furthermore, existing solutions for accessing media across an IP network tend to be media-specific and dependent on a general purpose computing platform—for example a PC. This makes accessing IP network based media expensive and complex to engineer.

OBJECT OF THE INVENTION

The invention seeks to provide an improved apparatus and method of operation for providing cost effective communication enabled consumer products and related control apparatus.

SUMMARY OF THE INVENTION

According to a first aspect of the present invention there is provided a consumer entertainment device comprising a telecommunications transceiver arranged for communication over a customer premises network.

Such devices include, but are not limited to, any one of a games console, an audio recording player, an audio visual recording player, and a radio frequency broadcast reception apparatus.

Preferably, said customer premises network is a wireless network.

The consumer entertainment device may comprise entertainment control apparatus and telephony handset apparatus and wherein said entertainment control apparatus and said telephone handset apparatus makes shared use of said telecommunications transceiver According to a further aspect of the present invention there is provided a media connections unit comprising: a customer premises network protocol interface; a public network protocol interface; interworking apparatus to enable communication between said interfaces.

Preferably, said customer premises network protocol interface is a wireless interface.

The media connections unit may additionally comprise: a store arranged to support at least one of buffering communications between said interfaces, and caching communications between said interfaces.

Preferably, said customer premises network protocol interface comprises: a protocol entity arranged to support communication of menu and menu item selection data.

Preferably, said customer premises network protocol Interface comprises: a protocol entity arranged to support communication of a media stream.

According to a further aspect of the present invention there is provided a customer premises equipment arrangement comprising: a media connections unit according to the present invention.

The customer premises equipment arrangement may additionally comprise: a modem arranged to modulate and demodulate signals on a public network from and to said public network protocol interface of said media connections unit According to a further aspect of the present invention there is provided a customer premises media system comprising: at least one consumer entertainment device comprising a customer premises network protocol interface; a media connections unit comprising a customer promises network protocol interface, a public network protocol interface, and interworking apparatus to enable communications between said interfaces; and a customer premises network arranged to support communication between said customer premises network protocol interfaces.

According to a further aspect of the present invention there is provided a network gateway comprising an access control unit, whereby to control access to a network from a remote media connections unit.

The invention is also directed to a telecommunications network comprising one or more instances of apparatus according to the foregoing aspects of the present invention.

Advantageously, multiple consumer devices are combined into one consumer item, allowing significant overall cost savings both to the user and manufacturer from sharing of common components, such as audio input/output devices, wireless networking components, display screens and selection devices.

Furthermore, such integrated units allow users to carry a single device operable to perform multiple device control and communication functions without requiring the full complexity and generality of functions supported by a personal computer.

Furthermore, Integration of control and communications functions in a single hand-held device allows users to operate multiple functions simultaneously from a single device. For example, a user may download MP3-encoded sound recordings to such a device while at the same time holding a telephone conversation via the same device. The sound recordings may, for example, be downloaded directly to a local media controller and from the media controller to the handset during periods of silence during the voice call.

Advantageously the market for cordless telephony devices is potentially larger than that for mobile telephones and the costs of ownership and usage potentially less.

The invention is also directed to a method by which the described apparatus operates and including method steps for carrying out every function of the apparatus.

The invention is also directed to a program for a computer, comprising components arranged to perform each of the method steps.

The invention is also directed to signals transmitted between the apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
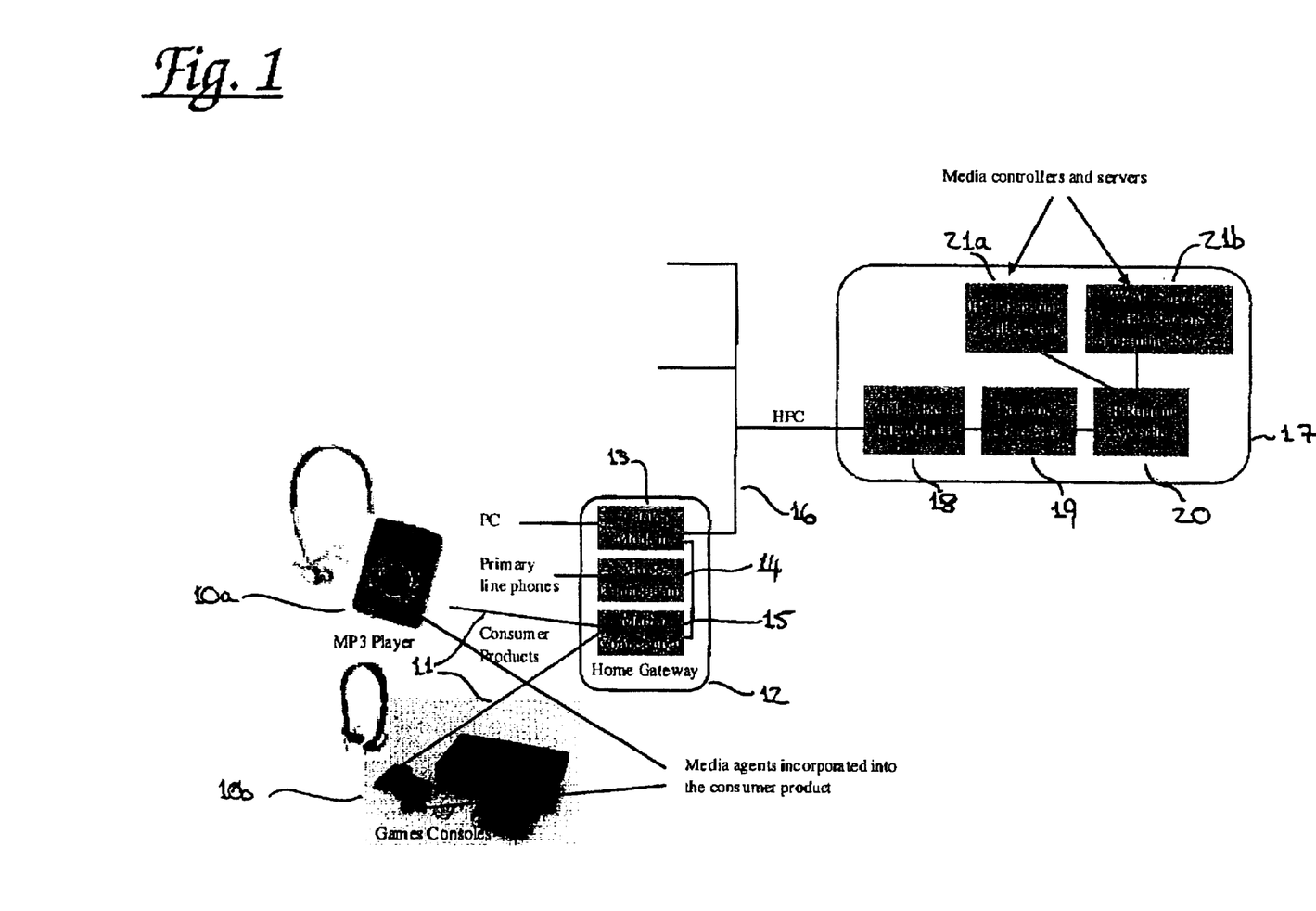
FIG. 1 shows a first example of a system in accordance with the present invention.

Referring to FIG. 1, there is shown an Integrated entertainment and communications network arrangement comprising communication-enabled consumer units 10a, 10b, linked by means of a low cost short range wireless network 11 (for example DECT, or BLUETOOTH) to home gateway 12 comprising a cable modem 13, voice connection unit 14, and a media connections unit which supports the short range wireless network connections to the consumer devices and connection via the cable modem 13 connected via a local access network 16 to a public network 17. The local access network is terminated in the public network at a cable modem head end 18 which provides a through connection via a network gateway 19 to an IP network 20 having servers arranged to support IP telephony 21a and other media services 21b (for example Wireless Access Protocol (WAP), compressed audio (MP3), and digital data stream services).

Figure 2:
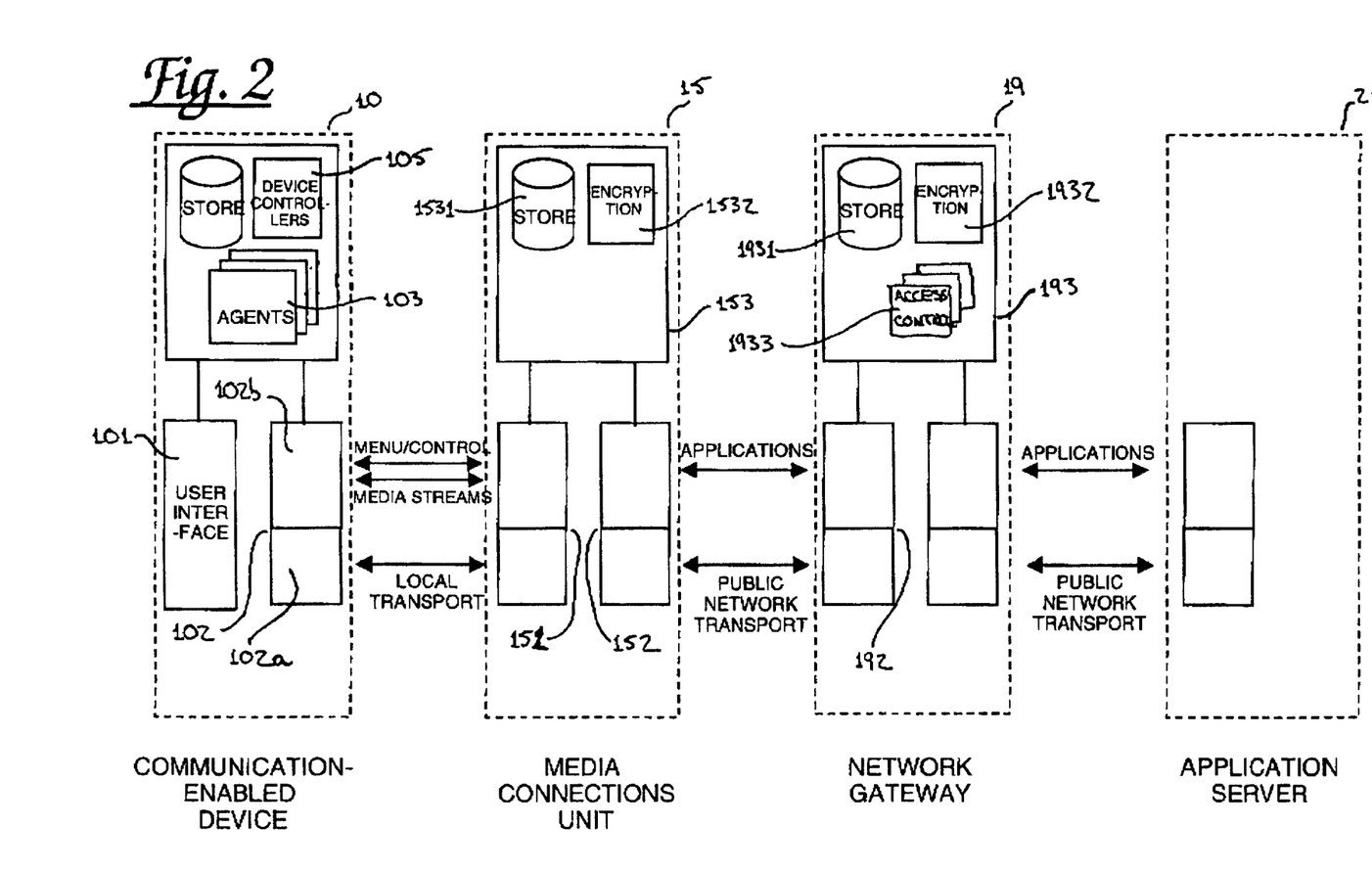
FIG. 2 shows a second, more detailed example of a system in accordance with the present invention.

FIG. 2 shows a further example of a system in accordance with the present invention, concentrating attention on a consumer device 10, a media connections unit 15, network gateway 19, and an applicable server 21.

The consumer device 10 comprises user interface hardware 101 (for example microphone, loud speaker, display screen, and selector buttons), a local access network protocol stack 102 and one or more media and menu control agents 103, and user interface controllers 105 arranged to control the flow of information between the user interface hardware 101 and the local area network protocol stack 102. The local area protocol stack comprises at least a local transport layer 102a, and one or more digital media streams and/or menu control protocols 102b.

The media connections unit comprises a local area network protocol stack 151 corresponding to that of the consumer device along with a public network access protocol stack 152 arranged to support communication out on to a public access network (for example using TCP/IP) with application protocols running above them. The media connections unit also comprises an inter-working unit 153 with a local buffer and/or cash store 1531 arranged to provide inter-working between the application protocols on the public access network and the menu control and digital media stream protocols on the local area network. It also provides the inter-working of the local access network protocols to the local transport protocols. The local storage medium 1531 may be used for temporary storage of media streams and other application-related information whether in the upstream direction from consumer device 10 towards network gateway 19, or in the downstream direction from network gateway towards consumer device. Buffering may be provided, for example, in the downstream direction to allow an application server to continuously download MP3 compressed audio files despite any temporary interruption of their onward transmission from the media controller to the consumer device. The storage device 1531 could also be used as a caching store whereby if a user wishes, for example, within a relatively short time span to download the same data to two or more devices or, for whatever reason, wishes to re-download the same data to the same consumer device, then this can be achieved without full retransmission from an application server within the public network: the required data can simply be extracted from the cache and re-transmitted locally. The media connections unit may also provide other local gateway functionality, for example encryption 1532 of upstream data and decryption of downstream data The network gateway provides a similar public access network protocol stack 192 to that in the media connections unit and provides complementary encryption and decryption functionality 1932 within an inter-working unit 193 as appropriate, along with access control functions 1933 which may determine the availability of network services to the specific subscriber. The network gateway provides onward communication across the public network to relevant application servers 21.

The local access network 11 between the consumer device and media controller is in a preferred embodiment a short range wireless network using an appropriate protocol (for example DECT, BLUETOOTH) but may more generally be achieved by any form of domestic or similar customer premises communications network). The protocols employed should be capable at least of downloading menus from the media connections unit and communicating selection information from consumer device to media connections unit, supporting real time traffic for games, voice, video where the consumer device is arranged to support those functionalities, apply quality of service controls to digital media streams transported over the network and, in a most preferred embodiment, provides dynamic variation of bandwidth allocation between consumer devices and media connections unit. Support for dynamic variation in bandwidth allocation allows optimal use of the available bandwidth between the consumer device and media controller, especially where this is provided by a wireless link. For example, download of MP3 files may require relatively large bandwidth allocation for short bursts whilst voice telephony requires a relatively low bandwidth continuously.

Other suitable local transport protocols include HyperLAN I and HyperLAN II (which is preferred over HyperLAN I insofar as HyperLAN II avoids collisions by providing separate control and traffic channels), and infra red protocols.

The arrangement enables communications capabilities for a wide range of media to be incorporated into consumer products. Media agents 103 providing an input/output function are incorporated into the consumer product 10 and may also be integrated with input/output capabilities 102 already present in the consumer device.

For example telephony capability may be integrated into portable audio players so that consumers can listen to their favourite stations and recordings over the internet, and then take phone calls without even having to move. Taking or making a telephone call may automatically reduce the audio player volume or pause play until the call is terminated.

Figure 3:
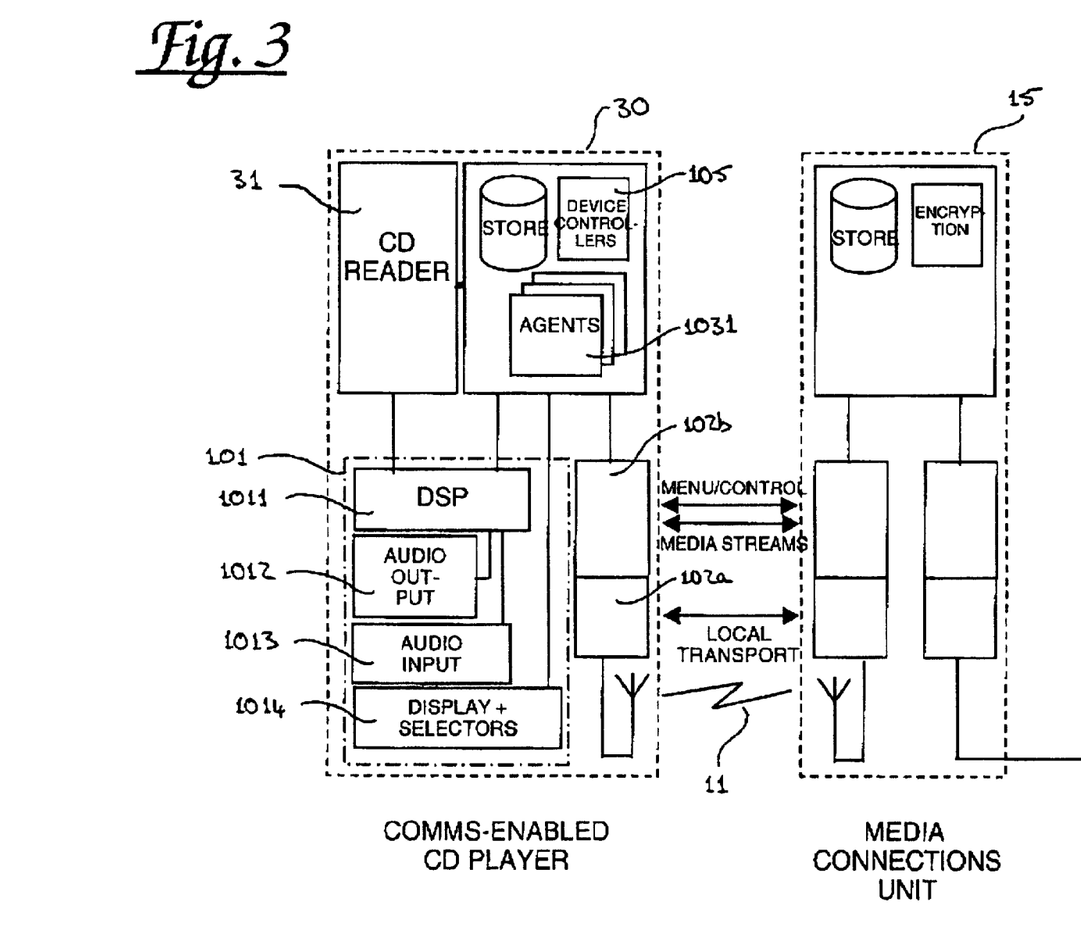
FIG. 3 shows a first example of a consumer device in accordance with the present invention.

For example, in a first embodiment shown in FIG. 3, a voice agent 1031 providing access to public network voice services takes advantage of the DSP circuitry 1011 and headset 1012 (and microphone 1013) of a portable CD player comprising an CD reader 31 (and optionally writer). The media streams used by the agent are then digitally encoded and together with appropriate control information transported to a media connections unit 15 of a home gateway unit 12 over a low cost short-range wireless network 11. The wireless access network is capable of supporting multiple simultaneous media streams between a number of devices and the gateway.

At the gateway 12, the digitally encoded media and control streams are mapped from the wireless access network onto a high speed IP transport, such as that provided by cable modem technology 13, 18.

The media and control streams are first intercepted by a network gateway unit 19 which constrains the services available over the network to those for which a valid subscription is currently active. The permitted media and control streams are then carried over an IP networking infrastructure 20 to media servers 21a, 21b which either source the content (for example music titles) or manage the media connection (for example a voice phone call).

The arrangement reduces the complexity involved in accessing IP network based media by utilizing a single home gateway unit 12 which does not require human intervention and can support a wide range of media types. The arrangement reduces cost by requiring only simple media agents 103 to be incorporated into traditional consumer products 10 and exploiting low cost short range wireless technologies 11 to link the consumer devices back to the home gateway unit.

The Media Connections Unit provides an inter-working capability between applications protocols designed for the distribution of digital media over networking protocols, and simple menu controls with a user interface orientation and digital media streams with an input/output orientation for distribution over a wireless local transport.

This enables users to access electronically distributed media through consumer devices which do not have to understand the complexity of protocols with a networking and application orientation.

The Network Gateway provides access control to application servers by only allowing connectivity to application servers that the users have subscribed to.

The arrangement is directed to meet the communications requirements of youth market within the home, with communication services that are integrated into consumer products and linked, via low-cost wireless networks, to high speed digital (e.g. IP) networks in general, and to IP cable media networks in particular.

Teenagers want to chat to their friends. Their requirements can be simple: dedicated access with complete secrecy from parents, brothers, and sisters. Parents' typical requirements are also simple and may include flat-rate tariffs and easy installation.

Both of these sets of requirements can be achieved by using packet telephony to provide multiple 'secondary' lines with wireless access from the gateway 12 to devices in the bedroom in combination with constrained dial plans and pre-paid cards utilised to achieve flat-rate tariffs.

Figure 4:
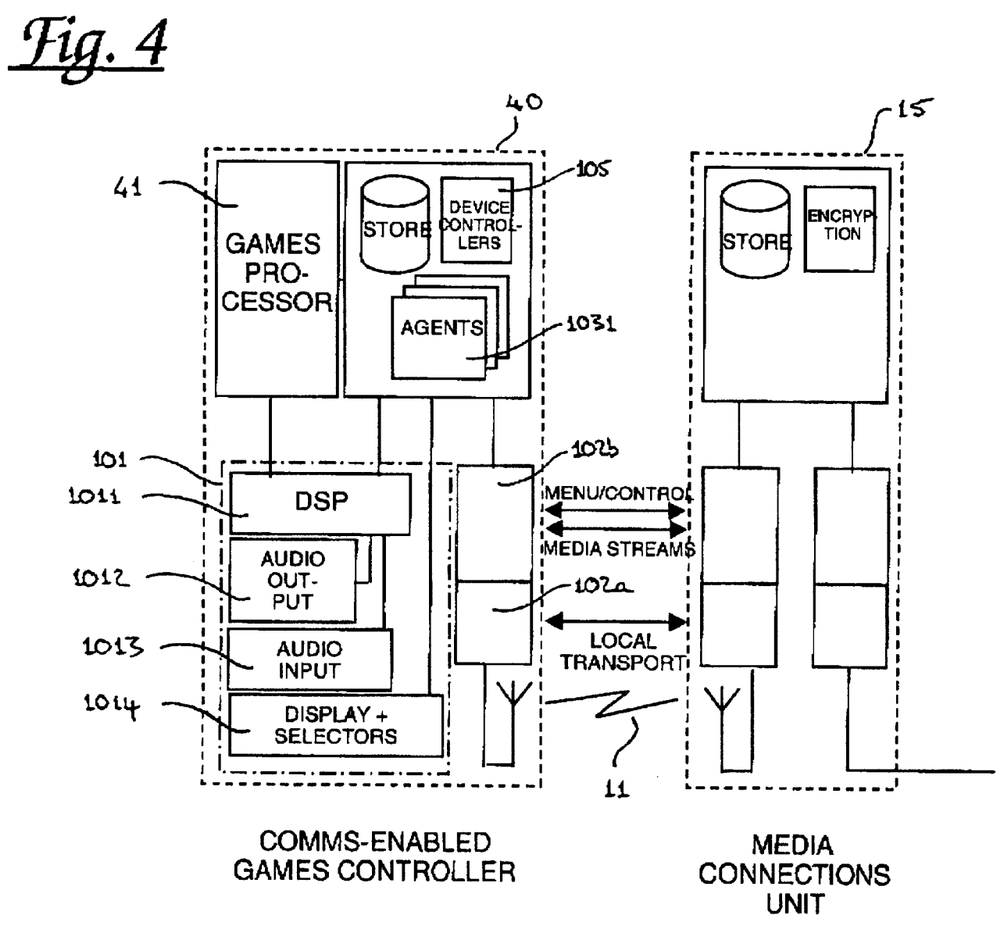
FIG. 4 shows a second example of a consumer device in accordance with the present invention.

In a second embodiment, shown in FIG. 4, a voice agent 1031 providing access to public network voice services takes advantage of the DSP circuitry 1011, headset 1012, microphone 1013, and display and game controls 1014 of a games console. Game consoles are perhaps at present the only devices that, when networked, stand any chance of exceeding the number of mobile phones owned by teenagers. How much better to be talking, grimacing, and consoling with your friends before, during, and after your latest efforts to save the universe in a shared on-line game.

As in the case of the first embodiment, the functions of the communications enabled game console may be integrated so that, for example, the game sound effects are muted while a telephone conversation is in progress via the communications enabled games controller. The arrangement could be used either while the user is engaged in an individual game on his local games console, or as part of an Interactive game with other players over the internet.

The arrangement of the communications enabled games controller 40 is similar to that of the communications enabled CD player but with a games processor 41 replacing the CD reader/writer and associated CD-specific controller.

Figure 5:
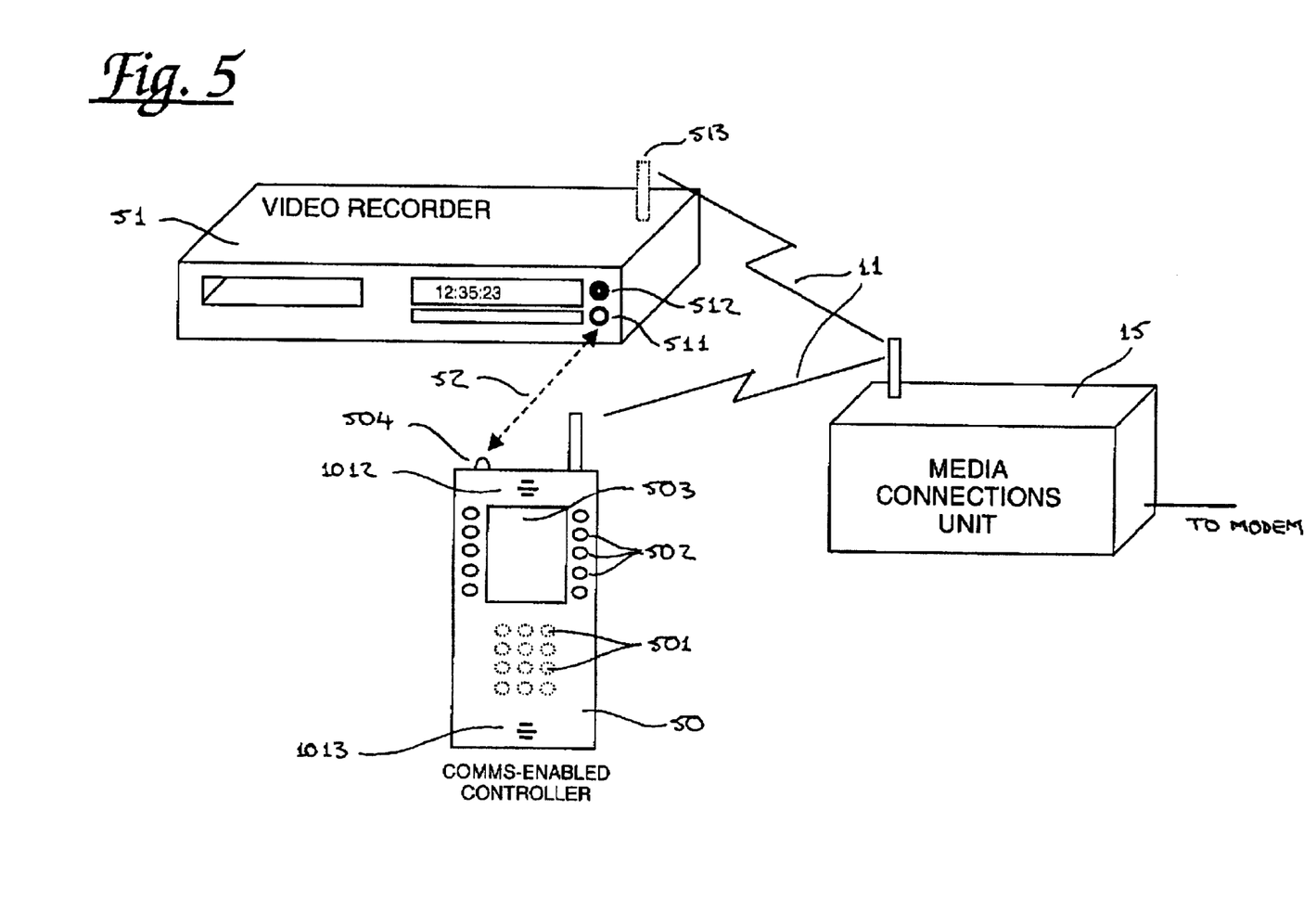
FIG. 5 shows a third example of consumer device in accordance with the present invention.

In a further embodiment a consumer device, a "universal controller" 50, also comprises a display screen 503 and selector buttons 501, 502 along with a local storage device and a short-range wireless transceiver. A remotely-controllable consumer device 51 (e.g. television, radio receiver, etc.) is provided with an transceiver which, in a first mode, is arranged to transmit pre-programmed instructions to the controller. The instructions indicate details of device control menus to be displayed on the universal controller screen along with details of corresponding control instructions to transmit from controller to device whereby to convey a specific user selection to the remotely-controllable consumer device. The signals between controller and remotely-controlled device may be transmitted directly from controller to device 52 or via 11 the media connections unit.

In one preferred embodiment, programming of the controller takes place by means of the local wireless network 11. In another embodiment, communication between remotely controlled device and controller is effected directly by means of an infra-red link 52 in addition to or instead of the short-range wireless link to the media connections unit.

In this way a single universal controller may be programmed and re-programmed to allow control of multiple remotely-controllable consumer devices. A top-level menu may be used to switch between instructions sets for distinct remotely-controllable devices.

Advantageously, consumers may purchase remote control devices independently of the specific devices or services controlled, and can carry a single such controller for use in conjunction with a number of remotely-controllable devices or services.

By adding audio input 1013 and output 1012 functions, the same device may be used as a cordless telephone within range of the same media connections unit, giving full telephony functionality in the same hand-held device. The telephone circuitry may make shared use of the display, buttons, storage device and transceiver used for the remote-control functions. The buttons may be soft keys 502 or dedicated function keys 501 or a combination of both.

Advantageously, users can take an incoming call and, for example, mute the television from a single hand-held controller, etc. This avoids having to get up to get the phone and hunt for the television remote control to mute the television, or vice versa. Once again taking or making a telephone call could be programmed automatically to reduce the television/radio volume for the duration of the call, or until overridden.

The power of targeting this kind of market by integrating communications functionality with existing consumer products in this way helps provide protection for the network operators' investments in wireline communications infrastructure and services:

It provides protection for those network operators who are concerned that a packet telephony solution will put their brand at risk. The proposed arrangement is quite distinct from the use of regular phones plugged into regular sockets and used by the regular grown ups in the home.

It provides a tremendous opportunity for upgrade whilst making use of an existing current primary telephony line and high speed modem services, with minimal incremental infrastructure expenditure and maximum linkage to the latest must-have consumer devices.

Advantageously, the cost involved, both to the consumer and network operator, in providing such a service is incremental over the existing infrastructure. Consumers use it to enhance, rather than replace, the capabilities of existing infrastructure. It also provides fast access to complementary Internet-based applications.

Many existing consumer devices comprise a visual display (for example liquid crystal display screen or in the case of games consoles, a full colour screen) and buttons for selecting items displayed on the screen and/or other functions of the device. Similarly many existing consumer devices also comprise audio output apparatus (e.g. loudspeakers and/or headphones), and in many cases audio input devices (e.g. microphones). Over time then, consumers purchase and pay for a multitude of display screens, loudspeakers, etc, whilst at any one time using one, or at most a small number of the devices containing them.

Furthermore, since existing devices have distinct and limited functionally, consumers must carry multiple devices (e.g. radio, mobile phone, and palm-top personal organiser) around the home, or go in search of a device left, for example, downstairs whilst the user is upstairs.

Any range or device value given herein may be extended or altered without losing the effect sought, as will be apparent to the skilled person for an understanding of the teachings herein.

What is claimed is:

1. A consumer entertainment device dedicated for presenting entertainment content to a consumer and comprising:
   a telecommunications transceiver integrated in the device and having a protocol arranged for communication over a customer premises local area network to a media connections unit, and a higher level protocol for access of remotely held entertainment content over a public network coupled to the media connections unit,
   a telephony terminal integrated in the device for a consumer to make or receive calls over the local area network, simultaneously with entertainment content being presented, and
   a remote control interface coupled to the transceiver and arranged to enable a remote controller to communicate over the customer premises local area network to control the presentation of entertainment.

2. A consumer entertainment device according to claim 1 wherein said device is one of a games console, an audio recording player, an audio visual recording player, and a radio frequency broadcast reception apparatus.

3. A consumer entertainment device according to claim 1 wherein said customer premises local area network is a wireless network.

4. A consumer entertainment device according to claim 1 comprising entertainment control apparatus and telephony handset apparatus and wherein said entertainment control apparatus and said telephone handset apparatus makes shared use of said telecommunications transceiver.

5. A customer premises equipment arrangement comprising one or more consumer entertainment devices and a media connections unit, the media connections unit comprising:
   a customer premises local area network protocol interface;
   a public network protocol interface;
   interworking apparatus to enable communication between said interfaces,
   the consumer entertainment devices being dedicated for presenting entertainment content to a consumer and comprising:
      a telecommunications transceiver integrated in the device and having a protocol arranged for communication over the customer premises local area network to the media connections unit, and a higher level protocol for access of remotely held entertainment content over a public network coupled to the media connections unit, and
      a remote control interface coupled to the transceiver and arranged to enable a remote controller to communicate over the customer premises local area network to control the presentation of entertainment.

6. A customer premises equipment arrangement according to claim 5 wherein said customer premises network protocol interface is a wireless interface.

7. A customer premises equipment arrangement according to claim 5 additionally comprising:
   a store arranged to support at least one of buffering communications between said interfaces, and caching communications between said interfaces.

8. A customer premises equipment arrangement according to claim 5 wherein said customer premises local area network protocol interface comprises:
   a protocol entity arranged to support communication of menu and menu item selection data.

9. A customer premises equipment arrangement according to claim 5 wherein said customer premises local area network protocol interface comprises:
   a protocol entity arranged to support communication of a media stream.

10. A customer premises equipment arrangement according to claim 5,
    a telephony terminal being integrated in the consumer entertainment device for a consumer to make or receive calls over the local area network, simultaneously with entertainment content being presented.

11. A customer premises equipment arrangement according to claim 10 additionally comprising:
    a modem arranged to modulate and demodulate signals on a public network from and to said public network protocol interface of said media connections unit.

12. A method of offering to a customer the use of the customer premises equipment arrangement of claim 5 for entertainment services.

13. A customer premises media system comprising:
    at least one consumer entertainment device for presenting entertainment content and comprising a customer premises local area network protocol interface;
    a media connections unit and a remote controller having a customer premises local area network protocol interface, the media connections unit comprising:
- a customer premises local area network protocol interface;
- a public network protocol interface; and
- interworking apparatus to enable communications between said interfaces;
- the consumer entertainment device or devices having a remote control interface coupled to the local area network protocol interface and arranged to enable the remote controller to communicate via the customer premises local area network to control the presentation of entertainment and the remote controller having a telephony terminal integrated to enable a consumer to make or receive calls over the local area network simultaneously with remote control of the entertainment content.

14. A network comprising the customer premises media system of claim 13 and a remote network gateway comprising an access control unit, whereby to control access to a network from the media connections unit of the customer premises media system.

15. A telecommunications network comprising a network gateway according to claim 14.

16. A method of offering to a customer the use of the customer premises media system of claim 13 for entertainment services.

17. A games console device dedicated for presenting entertainment content in the form of games to a consumer and comprising:
- a telecommunications transceiver integrated in the device and having a protocol arranged for communication over a customer premises local area network to a media connections unit, and a higher level protocol for accessing remotely held gaming information over a public network coupled to the media connections unit, and
- a telephony terminal integrated in the device for a consumer to make or receive calls over the local area network, simultaneously with playing a game.

18. A games console device dedicated for presenting entertainment content in the form of games to a consumer and comprising:
- a telecommunications transceiver integrated in the device and having a protocol arranged for accessing remotely held game related information over a public network,
- an audio interface, and
- a telephony terminal integrated in the device for a consumer to make or receive calls, simultaneously with playing a game, using the same telecommunications transceiver and audio interface.

* * * * *